(No Model.)  2 Sheets—Sheet 1.

E. BEARSS.
DEVICE FOR OPENING OR CLOSING VALVES FOR AIR BRAKE HOSE COUPLINGS.

No. 512,935.  Patented Jan. 16, 1894.

WITNESSES:
J. A. Bergstrom
C. Sedgwick

INVENTOR
E. Bearss
BY Munn & Co
ATTORNEYS.

(No Model.) 2 Sheets—Sheet 2.
E. BEARSS.
DEVICE FOR OPENING OR CLOSING VALVES FOR AIR BRAKE
HOSE COUPLINGS.
No. 512,935. Patented Jan. 16, 1894.
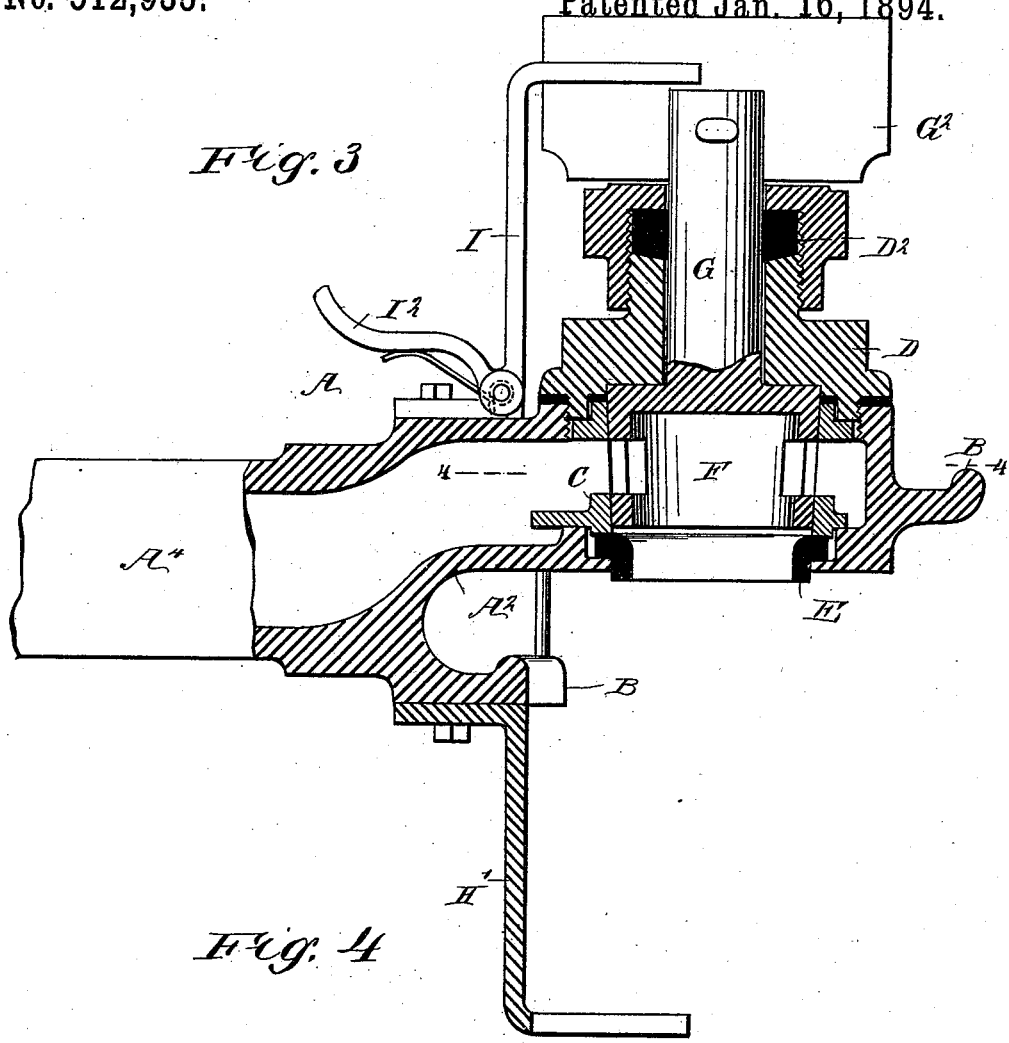
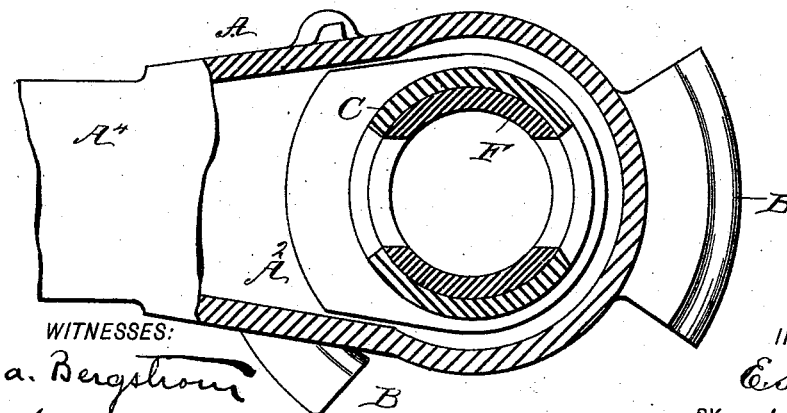
WITNESSES:
INVENTOR
BY
ATTORNEYS.

UNITED STATES PATENT OFFICE.

EUGENE BEARSS, OF ELLENVILLE, NEW YORK.

DEVICE FOR OPENING OR CLOSING VALVES FOR AIR-BRAKE HOSE-COUPLINGS.

SPECIFICATION forming part of Letters Patent No. 512,935, dated January 16, 1894.

Application filed September 20, 1893. Serial No. 485,954. (No model.)

*To all whom it may concern:*

Be it known that I, EUGENE BEARSS, of Ellenville, in the county of Ulster and State of New York, have invented a new and Improved Device for Opening and Closing Valves for Air-Brake Hose-Couplings, of which the following is a full, clear, and exact description.

The object of the invention is to provide a new and improved device for opening and closing, in a very simple and efficient manner, the valves for air brake hose couplings, whenever the two sections of the couplings are united so as to establish an uninterrupted passage for the air through the coupling, or when the sections are uncoupled, to automatically shut the valve in each section.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1:
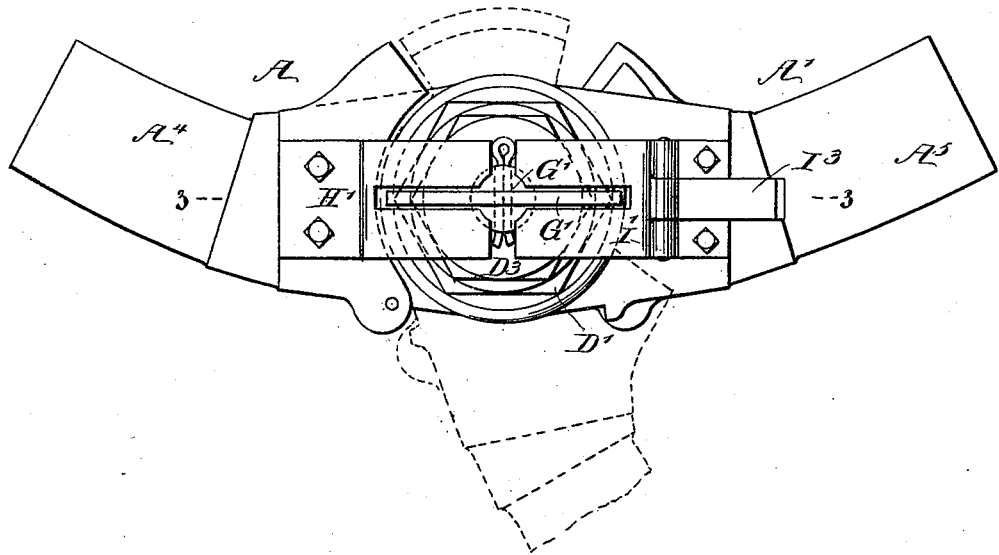
Figure 2:
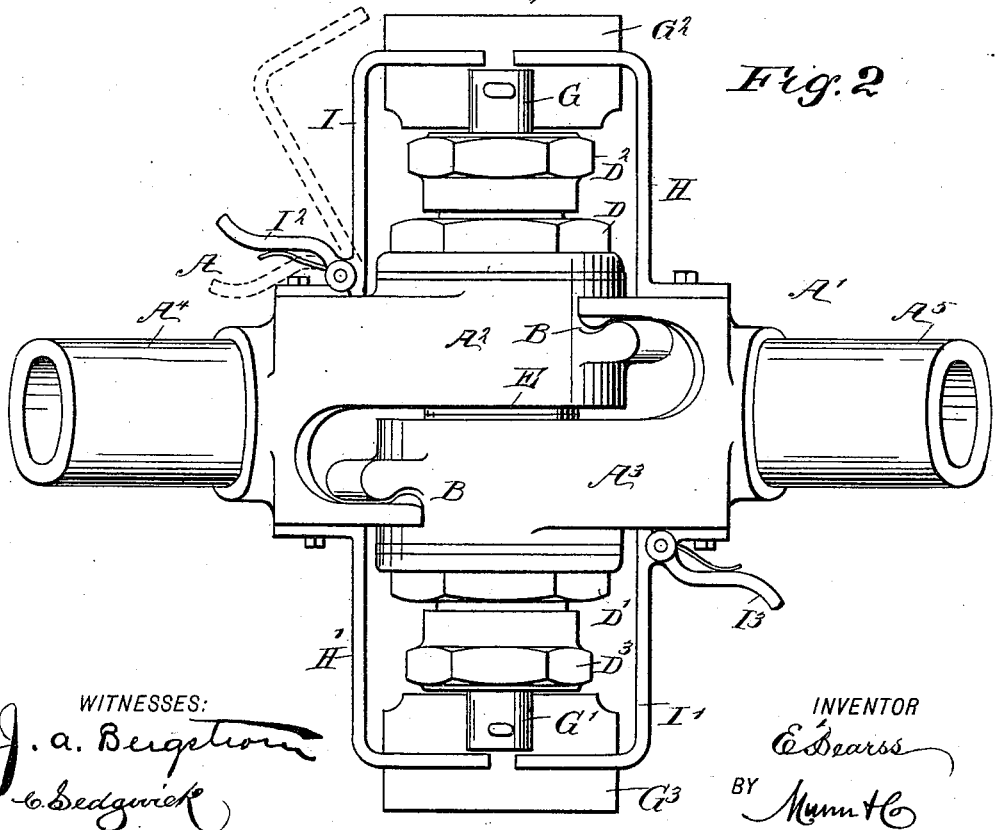

Figure 1 is a side elevation of the improvement. Fig. 2 is a plan view of the same. Fig. 3 is an enlarged sectional plan view of one coupling section on the line 3—3 of Fig. 1; and Fig. 4 is a sectional side elevation of the same on the line 4—4 of Fig. 3.

The improved hose coupling is provided with the two sections A and A' having valve bodies $A^2$ and $A^3$ respectively, provided with the pipes $A^4$ and $A^5$ respectively, connected with the hose extending under two adjacent cars. The sections A and A' are provided with the usual catches B for interlocking the sections, as is well understood.

In each valve body $A^2$ and $A^3$ of the sections is loosely fitted a valve seat C, resting at its inner end on a gasket E having its outer end projecting slightly beyond the opposite faces of the valve bodies, so that the said projecting ends of the two valve bodies move in firm contact with each other when the sections A and A' are united as illustrated in Figs. 1 and 2. The valve seats C in the valve bodies $A^2$ and $A^3$ are held in place by caps D and D' screwing in the outer faces of the said valve bodies $A^2$ and $A^3$ respectively, so as to securely press the inner end of the respective valve seat in firm contact with the inner face of the corresponding gasket E.

In the valve seats C of the valve bodies $A^2$ and $A^3$ are mounted to turn conical valves F provided with valve stems G and G' respectively, extending through the caps D and D' respectively, and through stuffing boxes $D^2$ and $D^3$ respectively, held on the said caps D and D' respectively. On the outer ends of the valve stems G and G' are secured the handles $G^2$ and $G^3$ respectively, preferably made in the shape of a flat plate and adapted to be engaged by the forked ends of arms H and H' respectively, of which the bar H is secured on the valve body $A^3$ and the other bar H' is secured on the valve body $A^2$. Now, it will be seen that when the two sections A and A' are coupled as illustrated in Figs. 1 and 2, then the conical valves F are open and a continuous passage is formed through the coupling from one hose to the other. Now, when the two sections are uncoupled by the operator turning one section on the other in the usual manner, then the section A carrying the arm H' engaging the handle $G^3$, turns the latter and consequently the stem G' carrying the valve F for the valve body $A^3$ and at the same time the arm H held on the section A' and engaging the handle $G^2$ secured on the stem G, turns the latter, and the valve F in the valve body $A^2$. Thus, at the time the two sections A and A' are in position for uncoupling, as illustrated in dotted lines in Fig. 1, the arms H and H' have turned the valves F sufficiently to close the same so that each section A and A' is shut. As the arms H and H' engage with their forked ends, the handles $G^2$ and $G^3$, the two sections can be readily moved apart in uncoupling and after the valves are turned, as the said forked ends readily slide from the said handles $G^2$ and $G^3$. The valves remain in this closed position until the sections are again coupled, at which time the arms H and H' again engage with their forked ends the handles $G^2$ and $G^3$ so that when the sections are moved in their normal coupling position, as indicated in Figs. 1 and 2, the handles are again turned by the arms H, H', so that the valves F are opened and a continuous passage is formed through the coupling.

In order to prevent a valve F in a section A or A', from accidentally turning when in an open position and in case the section is coupled with a section of a different construction, I provide forked arms I and I' pivoted on the sections A and A' respectively, opposite the arms H' and H respectively. The arms I and I' are spring pressed and are provided with handles $I^2$ and $I^3$ respectively, adapted to be engaged by the operator so as to move the arms I and I' out of engagement with the handles $G^2$ and $G^3$ respectively, whenever a coupling of the sections A and A' is to be effected in the manner above described. Now, it will be seen that when the arm I engages its handle $G^2$ the valve F is held in an open position, and the section A can now readily be coupled with a coupling section of a different construction, without danger of the valve F closing accidentally to interrupt the continuous passage through the coupling.

It will be seen that by the improved construction, the valves are securely held in an open position as long as the sections A and A' are coupled, as the arms H and H' prevent turning of the valves.

It will be seen that by unscrewing either of the caps D or D', the corresponding valve F can be readily removed from the seat C, and the latter can be easily taken out of the corresponding valve body for repairs or for other purposes. It will also be seen that by the special construction of valve seat described, an air-tight joint is formed, as the said valve seat is securely pressed in contact with the gasket by the corresponding cap D or D'.

Having thus fully described my invention, I claim as new and desire to secure by Letters Patent—

1. A device of the class described, comprising two movable interlocking sections, a valve in each section, and provided at the outer end of its valve stem with a flat plate forming a handle, and a forked arm rigidly held on one section and adapted to engage with its forked free end the flat plate of the valve in the other section, substantially as shown and described.

2. A device of the class described, comprising two movable interlocking sections, a valve in each section, and a spring pressed pivoted arm held on each section and adapted to engage with its forked end the handle of the valve in said section, substantially as shown and described.

EUGENE BEARSS.

Witnesses:
THEO. G. HOSTER,
EDGAR TATE.